United States Patent Office 3,057,743
Patented Oct. 9, 1962

3,057,743
NON-CRYSTALLIZING SUCROSE LOWER FATTY ACID ESTERS AND COMPOSITIONS THEREOF
George P. Touey and Herman E. Davis, Kingsport, Tenn., assignors to Eastman Kodak Company, Rochester, N.Y., a corporation of New Jersey
No Drawing. Filed Apr. 2, 1959, Ser. No. 803,584
8 Claims. (Cl. 106—169)

This invention relates to organic solvent-soluble, highly esterified sucrose propionates and sucrose isobutyrates and their method of preparation. In particular, it relates to highly but incompletely esterified sucrose propionates and sucrose isobutyrates which are non-crystallizing, highly viscous liquids adapted to be used as plasticizers or extenders for a number of polymeric materials.

Sucrose octapropionate is a well-known crystalline compound. This compound can be prepared by heating sucrose with a slight excess of propionic anhydride in the presence of sodium acetate or sodium propionate. Sucrose octaisobutyrate is also a crystalline compound. If these crystalline compounds are incorporated in plastic materials in significant amounts such as 25–50% there is a tendency for them to crystallize in the formulation which may cause the plastic to become brittle or opaque. In some cases, this crystallization is prevented by the addition of a third component to the plastic composition. In that case, however, one cannot be certain just how long the composition in use will remain free of crystals.

The higher-molecular-weight octa fatty acid esters of sucrose which are non-crystallizing, viscous liquids have been recommended in the past as plasticizers, but the preparation of those esters of sucrose presents difficulties. For instance, the well-known "acid chloride-pyridine" procedure is generally used. This method is regarded as expensive. If the "anhydride-sodium salt catalyst" technique is employed for making aliphatic acid esters of sucrose, the product is obtained in poor yield. In addition, some compounds of this type develop odor upon storage.

One object of our invention is to provide highly esterified, organic solvent-soluble, water insoluble sucrose propionates and sucrose isobutyrates which will remain as highly viscous heat stable liquids rather than crystallizing to solid compounds. A further object of our invention is to provide sucrose propionates and isobutyrates which are useful as plasticizers and extenders for plastics and films. A further object of our invention is to provide a simple procedure for preparing sucrose propionates and sucrose isobutyrates.

We have found that the above objects are accomplished by esterifying sucrose with either propionic or isobutyric anhydride in such manner that the content of unesterified hydroxyl groups per sucrose molecule is within the range of 0.25–1.50 (preferably 0.3–1.00) in the product. This hydroxyl content remains if the esterification with propionic or isobutyric anhydride proceeds until the sucrose is completely dissolved in the esterification mass. We have found that by carrying out the esterification short of completely satisfying the hydroxyl groups of the sucrose a non-crystalline ester is obtained which does not crystallize either after its preparation or upon prolonged storage. We have found that these products cannot be induced to crystallize by the addition of seed crystals of either sucrose octapropionate or sucrose octaisobutyrate.

In its broadest aspects the preparation of non-crystallizing sucrose propionates and isobutyrates as simple esters with the specified hydroxyl content are prepared by heating 1 mole of sucrose with an amount of the selected acid anhydride either propionic or isobutyric in an amount of 6.5–8, and preferably 7–8, moles of the acid anhydride until substantially all of the sucrose dissolves. The catalyst employed is an alkali metal salt of a lower fatty acid, preferably the sodium or potassium salt of an acid corresponding to the acid anhydride which is used in the reaction. It is important to use only the amount of anhydride specified, this amount being the critical feature of the invention. When less than 6.5 moles of anhydride per mole of sucrose is used a product is obtained in poor yield and partially soluble in water. When large amounts of the anhydride are employed such as over 8 moles thereof per mole of sucrose a crystalline sucrose ester results which appears to be substantially the octa substituted ester. The concentration of catalyst (sodium or potassium salt of the acid corresponding to the anhydride) may range from 1–20% based on the sucrose. The preferred concentration of catalyst is between 5 and 10%. The temperature used is ordinarily within the range of 80–150° C., the preferred range being 100–140° C. The reaction ordinarily takes place within 15 minutes to 1½ hours, although times outside of this range may be desirable. If desired, diluents such as the corresponding acid of the anhydride employed or various inert diluents may be added.

After the reaction has been completed, the organic acid formed therein is distilled off under reduced pressure and the product is washed with dilute aqueous alkali metal hydroxide and then with water. This washing may be conveniently accomplished by dissolving the sugar derivative in a water immiscible organic solvent such as toluene just prior to the washing step and washing the solution with water. The salt catalyst employed is removed by the aqueous washing and the water immiscible solvent is removed by distillation so that the sugar ester may be obtained in good yield (85% or better). The highly viscous, non-crystallizing sucrose propionates and isobutyrates obtained by the method described herein and which have 0.25–1.50 hydroxyls per sucrose molecule are highly compatible with cellulosic film base and plastic base materials such as cellulose acetate, cellulose acetate butyrate, cellulose propionate, ethyl cellulose and cellulose nitrate. There are also a number of non-cellulosic film base and plastic materials such as vinyl plastic and poly ester type plastic with which these sucrose esters are compatible. When incorporated into cellulosic and non-cellulosic compositions, the sucrose propionates and isobutyrates of our invention serve as plasticizers and as extenders for the products. The major utility of the sucrose propionates and isobutyrates having the prescribed hydroxyl therein is as extenders in plastic or film compositions. These sucrose esters may be incorporated into film or plastic formulations in amounts from 5% up to as high as 50–70% without producing soft or tacky products with poor strength. Conventional plasticizers often tend to give tacky soft films when used in high concentrations in compositions.

The following examples illustrate our invention:

*Example 1*

342 parts (1 mole) of sucrose was mixed with 1040 parts (8 moles) of propionic anhydride and 25 parts of sodium hydroxide and the mass was heated to 130° C., over a period of 45 minutes. This temperature was maintained for an additional 15 minutes. The sucrose dissolved in the liquid forming an amber colored solution which was concentrated by removing the propionic acid under reduced pressure. The mass thus obtained was dissolved in toluene and the resulting solution was washed with aqueous sodium hydroxide and then with water until neutral. The toluene was distilled off under reduced pressure leaving a residue consisting of 680 parts of a viscous, colorless liquid which corresponds to a yield of 88% based on the sucrose. The product contained an average of 7.6 propionyl groups and 0.4 hydroxyl group per sucrose molecule. It showed no tendency to crystallize after 5 months storage.

*Example 2*

The same procedure outlined in Example 1 was followed except that 910 parts (7 moles) of propionic anhydride was used. The product obtained was a colorless, viscous liquid having 7.1 propionyl groups and 0.9 hydroxyl group per sucrose molecule. The yield was 86% based on the sucrose. Although the product was stored for 5 months no crystallization occurred. An attempt to crystallize the product by the addition of sucrose octapropionate crystals was unsuccessful.

*Example 3*

(a) Example 1 was repeated except that 1264 parts (8 moles) of isobutyric anhydride were used instead of the propionic anhydride and the reactants were heated to 140° C. rather than 130° C. There was obtained 750 parts of colorless, viscous liquid having 7.2 isobutyryl groups and 0.8 hydroxyl group per sucrose molecule. The yield in this run was 85.3% based on the sucrose. This vicous liquid was stored for 5 months and no crystallization occurred.

(b) Example 1 was repeated except that 1,580 parts (10 moles) of isobutyric anhydride were used instead of the propionic anhydride and the reactants were heated to 140° C. for 2 hours. There was obtained 850 parts of a highly viscous liquid having 8 isobutyryl groups and no free hydroxyl groups per sucrose molecule. After a period of 6 hours at room temperature some crystals of sucrose octaisobutyrate appeared on the top of the product. Within 24 hours the entire product was a solid mass of crystals.

*Example 4*

A film was prepared consisting of 75 parts of sucrose propionate as prepared in Example 1 and 25 parts of cellulose triacetate cast from a methylene chloride-methanol solution thereof. The film obtained was clear and flexible and the sucrose propionate therein did not crystallize. This non-crystalline sucrose propionate when mixed with cellulose triacetate in compositions containing from 1–80% of the sucrose ester was found to be compatible therewith and no crystallization of sucrose propionate occured. When compositions are prepared of cellulose esters and sucrose octa propionate in various proportions films prepared therefrom become opaque and brittle after standing for a short time.

*Example 5*

Film was prepared in the same manner as described in Example 4 except that cellulose nitrate was employed instead of the cellulose triacetate. Clear flexible films free of crystallinity were obtained using sucrose propionate prepared as described above in various proportions with the cellulose nitrate.

*Example 6*

Films were prepared in accordance with the description of Example 4 except that cellulose acetate butyrate was employed as the cellulose ester instead of the cellulose triacetate. Clear flexible films free of crystallinity were obtained from compositions of various proportions containing sucrose propionate prepared as described above.

*Example 7*

25% of sucrose propionate as prepared in Example 1 was mixed with 75% of methyl methacrylate. A clear hard polymer was obtained similar to the methyl methacrylate without the sucrose propionate extender.

*Example 8*

A film was prepared consisting of 65 parts of the incompletely esterified sucrose isobutyrate (as prepared in Example 3) and 35 parts of cellulose acetate butyrate cast from a methylene chloride-methanol solution thereof. The film obtained was clear and flexible and the sucrose isobutyrate therein did not crystallize.

A similar film was prepared using the crystalline sucrose octaisobutyrate of Example 3. Within 24 hours the film became opaque and brittle due to the crystallization of the sugar ester.

The term "simple esters" as used herein in referring to the sucrose propionates and isobutyrates confines those esters to compounds having only propionyl or isobutyryl as the sole acyl therein.

We claim:

1. A composition consisting essentially of a mixture of a lower fatty acid ester of cellulose and a non-crystallizing sucrose ester selected from the group consisting of the sucrose propionates and the sucrose isobutyrates having 0.25–1.50 unesterified hydroxyl groups per sucrose molecule the sucrose ester constituting 5–70% of the mixture.

2. A composition consisting essentially of a mixture of a lower fatty acid ester of cellulose and a non-crystalline sucrose propionate having 0.25–1.50 hydroxyl groups per sucrose molecule the latter constituting 5–70% of the mixture.

3. A composition consisting essentially of a mixture of a lower fatty acid ester of cellulose and a noncrystallizing sucrose isobutyrate which has 0.25–1.50 unesterified hydroxyl groups per sucrose molecule the latter constituting 5–70% of the mixture.

4. Non-crystallizing liquid sucrose esters adapted for use as plasticizers and extenders in plastic compositions selected from the group consisting of the simple sucrose propionates and the simple sucrose isobutyrates having 0.25–1.50 unesterified sucrose hydroxyl groups per sucrose molecule.

5. Non-crystallizing liquid sucrose propionate adapted for use as a plasticizer and extender in plastic compositions which sucrose propionate has propionyl as the only acyl therein and has 0.25–1.50 unesterified sucrose hydroxyl groups per molecule.

6. Non-crystallizing liquid sucrose isobutyrate adapted for use as a plasticizer and extend in plastic compositions which sucrose isobutyrate has isobutyryl as the only acyl therein and has 0.25–1.50 unesterified sucrose hydroxyl groups per sucrose molecule.

7. Non-crystallizing liquid sucrose propionate adapted for use as a plasticizer and extender in plastic compositions which sucrose propionate has a propionyl content of 7.6 propionyl groups and a hydroxyl content of 0.4 sucrose hydroxyl group per sucrose molecule.

8. Non-crystallizing liquid sucrose isobutyrate adapted for use as a plasticizer and extender in plastic compositions which sucrose isobutyrate contains 7.2 isobutyryl groups and 0.8 unesterified sucrose hydroxyl group per sucrose molecule.

References Cited in the file of this patent

UNITED STATES PATENTS

| | | |
|---|---|---|
| 1,959,590 | Lorand | May 22, 1934 |
| 2,013,034 | Cox et al. | Sept. 3, 1935 |
| 2,092,677 | Lovett | Sept. 7, 1937 |
| 2,126,936 | Wall | Aug. 16, 1938 |
| 2,931,802 | Touey et al. | Apr. 5, 1960 |

FOREIGN PATENTS

| | | |
|---|---|---|
| 552,161 | Great Britain | Mar. 25, 1943 |

OTHER REFERENCES

Zief.: Dept. of Agr. Publication AIC 309, September 1951, article entitled "Saturated Esters of Sucrose," pp. 1 to 4.